(12) United States Patent
Zhang

(10) Patent No.: US 10,705,592 B2
(45) Date of Patent: Jul. 7, 2020

(54) EFFICIENT REDUCTION IN ELECTRIC POWER CONSUMPTION FOR A PARALLEL PROCESSING SYSTEM

(71) Applicant: FUJITSU LIMITED, Kawasaki-shi, Kanagawa (JP)

(72) Inventor: Lei Zhang, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 226 days.

(21) Appl. No.: 16/001,990

(22) Filed: Jun. 7, 2018

(65) Prior Publication Data

US 2018/0356875 A1 Dec. 13, 2018

(30) Foreign Application Priority Data

Jun. 12, 2017 (JP) ................................. 2017-115310

(51) Int. Cl.
| | | |
|---|---|---|
| G06F 1/32 | (2019.01) | |
| G06F 1/3287 | (2019.01) | |
| G06F 1/329 | (2019.01) | |
| G06F 1/3234 | (2019.01) | |
| G06F 1/324 | (2019.01) | |

(52) U.S. Cl.
CPC ............ *G06F 1/3287* (2013.01); *G06F 1/324* (2013.01); *G06F 1/329* (2013.01); *G06F 1/3234* (2013.01)

(58) Field of Classification Search
None
See application file for complete search history.

(56) References Cited

U.S. PATENT DOCUMENTS

| | | | | |
|---|---|---|---|---|
| 8,245,066 B1* | 8/2012 | Sharkey | ................ | G06F 9/4401 713/324 |
| 2003/0088606 A1* | 5/2003 | Miller | ................... | G06F 9/4881 718/102 |
| 2004/0237087 A1* | 11/2004 | Ye | ......................... | G06F 9/4881 718/101 |
| 2007/0157206 A1* | 7/2007 | Rakvic | ................. | G06F 9/4893 718/102 |
| 2007/0220520 A1* | 9/2007 | Tajima | ................. | G06F 9/4881 718/104 |

(Continued)

FOREIGN PATENT DOCUMENTS

| | | |
|---|---|---|
| JP | 2008-198072 | 8/2008 |
| JP | 2013-101576 | 5/2013 |
| JP | 2016-071841 | 5/2016 |

*Primary Examiner* — Danny Chan
(74) *Attorney, Agent, or Firm* — Fujitsu Patent Center

(57) ABSTRACT

A system includes a management device and nodes that execute plural jobs in parallel. When a total electric-power consumption of the nodes reaches a threshold, the management device extracts a first job of the largest electric-power consumption from among the plural jobs, based on information about an electric-power consumption of each node and information about the plural jobs that are executed in parallel by the nodes. The management device reduces the electric-power consumption of a first node that executes the first job when a remaining execution time of the first job, which indicates a period of time from a current time until a scheduled end time of the first job, is longer than or equal to a predetermined time, and reduces the electric-power consumption of a second node that does not execute the first job, when the remaining execution time of the first job is shorter than the predetermined time.

6 Claims, 10 Drawing Sheets

(56) References Cited

U.S. PATENT DOCUMENTS

| | | | |
|---|---|---|---|
| 2010/0241884 A1* | 9/2010 | Barsness | G06F 1/3203 |
| | | | 713/322 |
| 2013/0262905 A1* | 10/2013 | Yamauchi | G06F 11/3062 |
| | | | 713/340 |
| 2015/0205614 A1* | 7/2015 | Lahteenmaki | G06F 9/5083 |
| | | | 712/215 |
| 2015/0321980 A1* | 11/2015 | Levin | C10B 49/22 |
| | | | 568/881 |

* cited by examiner

| NODE ELECTRIC POWER CONSUMPTION INFORMATION ||
|---|---|
| NODE IDENTIFIER | ELECTRIC POWER CONSUMPTION |
| 0xFF010004 | 120 |
| 0xFF010005 | 100 |
| 0xFF010006 | 200 |
| 0xFF010007 | 150 |
| 0xFF010008 | 80 |

| JOB STATISTICAL INFORMATION |||
|---|---|---|
| JOB IDENTIFIER | SCHEDULED JOB END TIME | NODE IDENTIFIER |
| 7101927 | 20:30 | 0xFF010004 |
| | | 0xFF010005 |
| 7119895 | 20:00 | 0xFF010006 |
| | | 0xFF010007 |
| — | — | 0xFF010008 |

| JOB-BASED ELECTRIC POWER CONSUMPTION INFORMATION | | |
|---|---|---|
| JOB IDENTIFIER | NODE IDENTIFIER | TOTAL ELECTRIC POWER CONSUMPTION |
| 7101927 | 0xFF010004 | 240 |
|  | 0xFF010005 |  |
| 7119895 | 0xFF010006 | 350 |
|  | 0xFF010007 |  |
| — | 0xFF010008 | 80 |

| JOB INFORMATION | | | |
|---|---|---|---|
| JOB IDENTIFIER | NODE IDENTIFIER | REMAINING JOB EXECUTION TIME | TOTAL ELECTRIC POWER CONSUMPTION |
| 7101927 | 0xFF010004 | 40 MINUTES | 240 |
|  | 0xFF010005 |  |  |
| 7119895 | 0xFF010006 | 10 MINUTES | 350 |
|  | 0xFF010007 |  |  |
| — | 0xFF010008 | — | 80 | ively reduction in electric power consumption for a parallel pro-
EFFICIENT REDUCTION IN ELECTRIC POWER CONSUMPTION FOR A PARALLEL PROCESSING SYSTEM

CROSS-REFERENCE TO RELATED APPLICATION

This application is based upon and claims the benefit of priority of the prior Japanese Patent Application No. 2017-115310, filed on Jun. 12, 2017, the entire contents of which are incorporated herein by reference.

FIELD

The embodiments discussed herein are related to efficient reduction in electric power consumption for a parallel processing system.

BACKGROUND

Currently, a parallel processing system that performs massive calculation is utilized. For example, in a parallel processing system, a plurality of nodes that execute calculation are connected to each other, and calculation is performed by the nodes in parallel. The operations of the nodes consume electric power. For this reason, a method of controlling an electric power consumption of the nodes has been developed.

For example, a job management device has been suggested (see, for example, Japanese Laid-open Patent Publication No. 2016-071841). At the time of adding a new job, the job management device creates a schedule of jobs such that a total electric power consumption per a certain time does not exceed a threshold. A power control system has also been suggested (see, for example, Japanese Laid-open Patent Publication No. 2013-101576). At the time of inputting a job to a server, the power control system determines whether an electric power consumption of the server exceeds an upper limit based on a predicted electric power consumption predicted from a current electric power consumption and past electric power consumption data of the server. When the electric power consumption of the server exceeds the upper limit, the power control system delays the timing of inputting the job.

Furthermore, a real-time calculator has been suggested (see, for example, Japanese Laid-open Patent Publication No. 2008-198072). The real-time calculator predicts a processing load of a processor at processing intervals, and controls the operating frequency of the processor, the rotation speed of a cooling fan that cools the processor, and a memory area that the processor uses, based on the predicted processing load at processing intervals.

SUMMARY

According to an aspect of the invention, an apparatus stores first information about an electric power consumption of each of a plurality of nodes and second information about a plurality of jobs that are executed in parallel by the plurality of nodes. When a total electric power consumption of the plurality of nodes reaches a threshold, the apparatus extracts a first job of the largest electric power consumption from among the plurality of jobs, based on the first and second information. When a remaining execution time of the first job, which indicates a period of time from a current time until a scheduled end time of the first job, is longer than or equal to a predetermined time, the apparatus executes a first process of reducing the electric power consumption of a first node that executes the first job. When the remaining execution time of the first job is shorter than the predetermined time, the apparatus executes a second process of reducing the electric power consumption of a second node that does not execute the first job.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a table that illustrates an example of node electric power consumption information;

FIG. 7 is a table that illustrates an example of job statistical information;

FIG. 8 is a table that illustrates an example of job-based electric power consumption information;

FIG. 9 is a table that illustrates an example of job information;

DESCRIPTION OF EMBODIMENTS

There is a case where a parallel processing system is operated such that an electric power consumption of the parallel processing system does not exceed a predetermined upper limit electric power. For example, when the electric power consumption is likely to exceed the upper limit electric power, it is conceivable to interrupt electric power to all the nodes or shifting the hardware components of all the nodes into a power-saving mode. Alternatively, it is conceivable to reduce the electric power consumption by, for example, stopping or underclocking the node that is executing a job of the largest electric power consumption. However, if a node that is executing a job is, for example, stopped or underclocked, there is an increased possibility that the node does not complete the job. When a job is not completed, a user issues instructions to execute the job again, and the job is executed again by the parallel processing system. Therefore, considering in the medium and long terms, a completion rate of a job of a large electric power consumption decreases, so the amount of electric power to be consumed may be excessive as a result of re-execution of the uncompleted job.

In one aspect, it is an object of the disclosure to reduce the amount of electric power to be consumed.

First Embodiment

Figure 1:
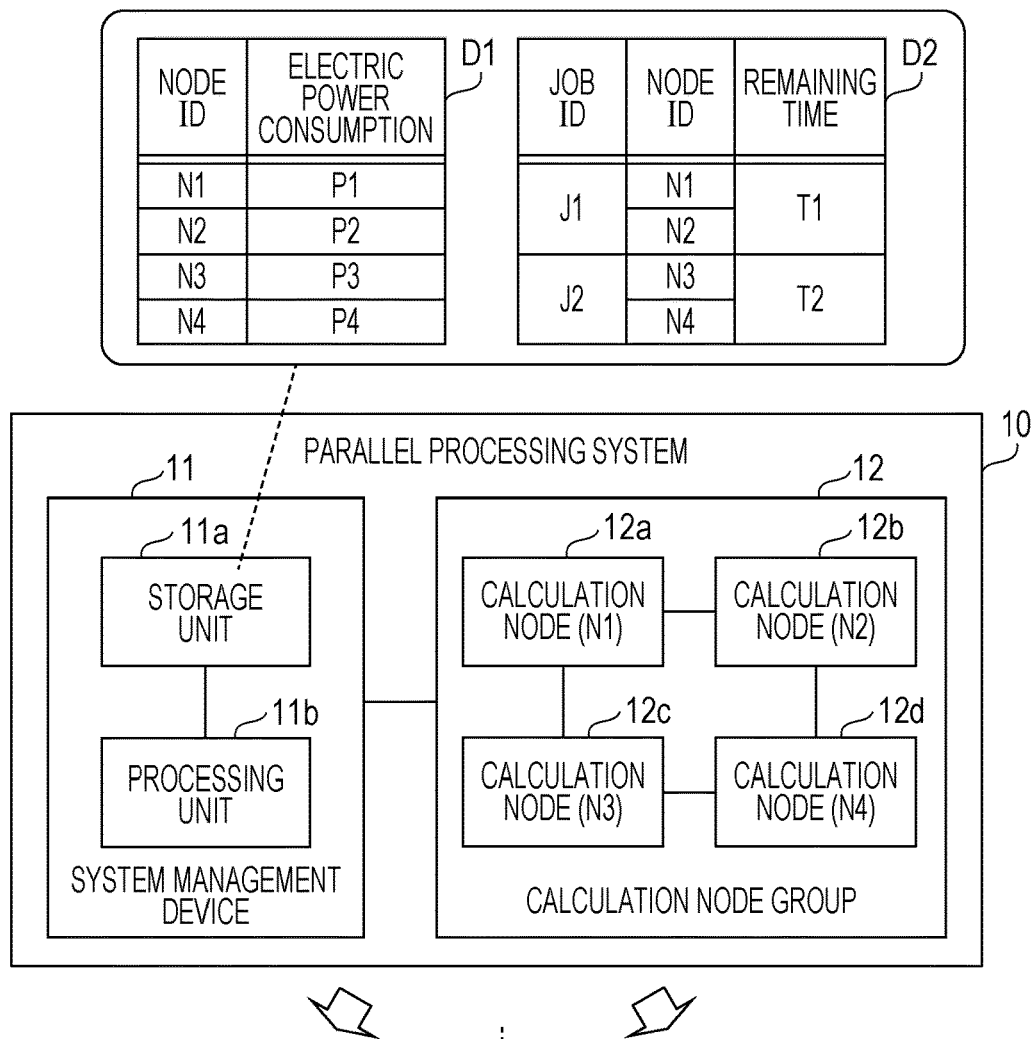
FIG. 1 is a diagram that depicts an example of a parallel processing system of a first embodiment.
Figure 1:
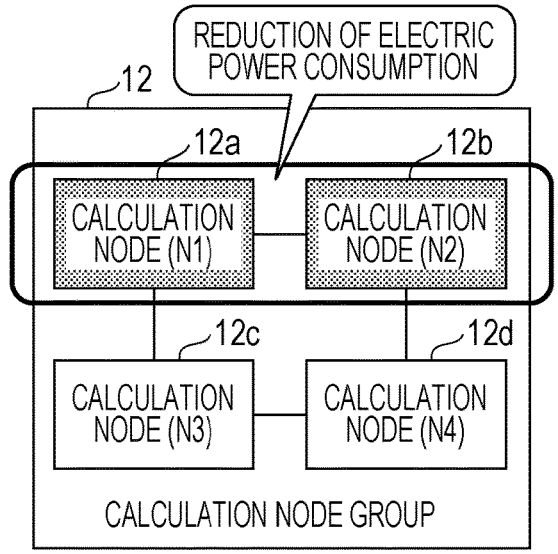
Figure 1:
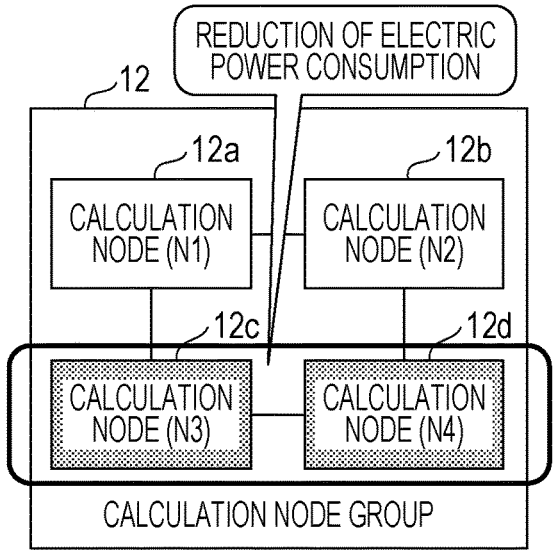

FIG. 1 is a diagram that depicts an example of a parallel processing system of a first embodiment. The parallel processing system 10 includes a system management device 11 and a calculation node group 12. The system management device 11 is coupled to a plurality of calculation nodes via a predetermined network of the parallel processing system 10, and controls each calculation node, where the calculation nodes belong to the calculation node group 12. The parallel processing system 10 executes a plurality of jobs in parallel with the use of the plurality of calculation nodes that belong to the calculation node group 12. One job is allocated to one or more calculation nodes, and is executed by the one or more calculation nodes. A job occupies one or more calculation nodes to which the job is allocated.

For example, the plurality of calculation nodes include calculation nodes 12a, 12b, 12c, 12d. The identification information (node identifier (ID)) of the calculation node 12a is "N1". The node ID of the calculation node 12b is "N2". The node ID of the calculation node 12c is "N3". The node ID of the calculation node 12d is "N4". A job is identified by the identification information (job ID) of the job. As an example, two jobs that are respectively identified by the job IDs "J1", "J2" are discussed. For example, the job of the job ID "J1" is allocated to the calculation nodes 12a, 12b. The job of the job ID "J2" is allocated to the calculation nodes 12c, 12d. For example, allocation of a job to calculation nodes is made by a job management node (not depicted in FIG. 1).

The system management device 11 includes a storage unit 11a and a processing unit 11b. The storage unit 11a may be a volatile storage device, such as a random access memory (RAM), or may be a nonvolatile storage device, such as a hard disk drive (HDD) and a flash memory. The processing unit 11b may include a central processing unit (CPU), a digital signal processor (DSP), an application specific integrated circuit (ASIC), a field programmable gate array (FPGA), or the like. The processing unit 11b may be a processor that executes a program. The "processor" may also include a collection of a plurality of processors (multi-processor).

The storage unit 11a stores information about an electric power consumption of each of the plurality of nodes and information about a plurality of jobs that are executed in parallel by the plurality of nodes. For example, the storage unit 11a stores tables D1, D2.

The table D1 is information about an electric power consumption of each node. A node ID and an electric power consumption are registered in the table D1. The unit of electric power consumption is watt (W). For example, information that the electric power consumption of the calculation node 12a of the node ID "N1" is "P1" is registered in the table D1. Information that the electric power consumption of the calculation node 12b of the node ID "N2" is "P2" is registered in the table D1. Information that the electric power consumption of the calculation node 12c of the node ID "N3" is "P3" is registered in the table D1. Information that the electric power consumption of the calculation node 12d of the node ID "N4" is "P4" is registered in the table D1.

The table D2 is information about jobs. A job ID, a node ID, and a remaining time are registered in the table D2. The remaining time is a time from current time to scheduled end time of a corresponding job (remaining execution time).

For example, a record that the job ID is "J1", the node IDs are "N1", "N2", and the remaining time is "T1", is registered in the table D2. This indicates that the job of the job ID "J1" is being executed by the calculation nodes 12a, 12b and the remaining time of the job is "T1". A record that the job ID is "J2", the node IDs are "N3", "N4", and the remaining time is "T2", is registered in the table D2. This indicates that the job of the job ID "J2" is being executed by the calculation nodes 12c, 12d and the remaining time of the job is "T2". For example, the processing unit 11b may acquire information of the table D2 from the above-described job management node.

As a total electric power consumption of the plurality of nodes reaches a threshold, the processing unit 11b extracts a first job of the largest electric power consumption from among the jobs, based on the information stored in the storage unit 11a. One job occupies one or more calculation nodes to which the job is allocated as described above, so the sum of electric power consumptions of the one or more calculation nodes is regarded as an electric power consumption for executing the job. According to the tables D1, D2, the electric power consumption of the job of the job ID "J1" is P1+P2. The electric power consumption of the job of the job ID "J2" is P3+P4.

The threshold for the total electric power consumption may be an upper limit of a permissible electric power consumption or may be a value smaller than the upper limit. The upper limit of the permissible electric power consumption is, for example, set in advance by a system administrator. The upper limit of the permissible electric power consumption may be a contract demand that is determined in advance in accordance with a contract with a power company, or the like.

For example, the processing unit 11b monitors the total electric power consumption of the calculation nodes 12a, 12b, 12c, 12d, and, when the total electric power consumption reaches the threshold, extracts the first job of the largest electric power consumption from between the jobs of the job IDs "J1", "J2". It is assumed that, between the jobs of the job IDs "J1", "J2", the job of the largest electric power consumption (first job) is the job of the job ID "J1". That is, P1+P2>P3+P4.

The processing unit 11b determines whether a time until the scheduled end time of the first job is longer than or equal to a predetermined time, based on the information stored in the storage unit 11a. For example, it is assumed that the predetermined time is T0. The predetermined time T0 is determined in advance in accordance with operation. A time until the scheduled end time of the first job corresponds to the remaining time T1 in the table D2.

When the time until the scheduled end time of the first job is longer than or equal to the predetermined time (T0), the processing unit 11b executes the process of reducing the electric power consumption of the first node that executes the first job. On the other hand, when the time until the scheduled end time of the first job is shorter than the predetermined time (T0), the processing unit 11b executes the process of reducing the electric power consumption of a second node other than the first node, which does not execute the first job. The process of reducing the electric power consumption is conceivably operating an intended node in a power-saving mode, stopping an intended node, or the like. For example, the power-saving mode is conceivably a mode in which an intended node operates at a decreased (underclocked) operating frequency of the processor of the intended node, a mode in which an intended node operates while part of processors of the intended node is stopped, or the like.

For example, when a time (remaining time) T1 until the scheduled end time of the job of the job ID "J1", extracted as the first job, satisfies T1≥T0, the processing unit 11b executes the process of reducing the electric power consumptions of the calculation nodes 12a, 12b (in the case of (A) in FIG. 1). At this time, the processing unit 11b maintains the current operation for the calculation nodes 12c, 12d.

On the other hand, when the remaining time T1 satisfies T1<T0, the processing unit 11b executes the process of reducing the electric power consumptions of the calculation nodes 12c, 12d (in the case of (B) in FIG. 1). At this time, the processing unit 11b maintains the current operation for the calculation nodes 12a, 12b.

With the parallel processing system 10, it is possible to reduce the amount of electric power (for example, in watthour (Wh)) to be consumed. In order to reduce the electric power consumption of the parallel processing system 10, it is conceivable to, for example, stop or underclock a calculation node that is executing a job of the largest electric power consumption. However, if the calculation node that is executing the job is, for example, stopped or underclocked, there is an increased possibility that the calculation node does not complete the job. When the job is not completed, a user issues instructions to execute the job again, and the job is executed again by the parallel processing system 10. In executing the job again, the job is re-executed from the beginning. Therefore, considering in the medium and long terms, a completion rate of a job of a large electric power consumption decreases, so that the amount of electric power to be consumed may be excessive in the parallel processing system 10 as a result of re-execution of the uncompleted job.

The system management device 11 selects a calculation node of which the electric power consumption is to be reduced, in accordance with a comparison between the predetermined time and the time until the scheduled end time of the first job of the largest electric power consumption. When the time until the scheduled end time of the first job is longer than or equal to the predetermined time T0, the system management device 11 executes the process of reducing the electric power consumption of the first node that executes the first job. In this case, when the time until the scheduled end time of the first job is longer than or equal to the predetermined time T0, the degree of progress of the first job is estimated to be low. Therefore, even if the first job does not complete, a loss of the amount of electric power for executing the first job is reduced. By reducing the electric power consumption of the first node of the largest electric power consumption, the electric power consumption of the overall system is efficiently reduced, and it is possible to continue execution of the second job by the second node other than the first node.

On the other hand, when the time until the scheduled end time of the first job is shorter than the predetermined time T0, the system management device 11 executes the process of reducing the electric power consumption of the second node other than the first node that executes the first job. In this case, when the time until the scheduled end time of the first job is shorter than the predetermined time T0, the degree of progress of the first job is estimated to be high. If the first job does not complete, a loss of the amount of electric power for executing the first job till then is large. If the completion rate of the first job is decreased by reducing the electric power consumption of the first node although the first job ends soon, there is a high risk that the amount of electric power to be consumed by the process of the first job till then and re-execution of the first job becomes large. For this reason, when the remaining time of the first job is relatively short, the processing unit 11b reduces the electric power consumption of the second node and gives a higher priority to execution of the first job. Thus, the processing unit 11b executes control such that the first job appropriately completes.

By improving the completion rate of a job of the largest electric power consumption, it is possible to reduce re-execution of the job and reduce the amount of electric power to be consumed in the parallel processing system 10.

Hereinafter, the functions of the system management device 11 will be described in detail by illustrating a more specific system.

Second Embodiment

Figure 2:
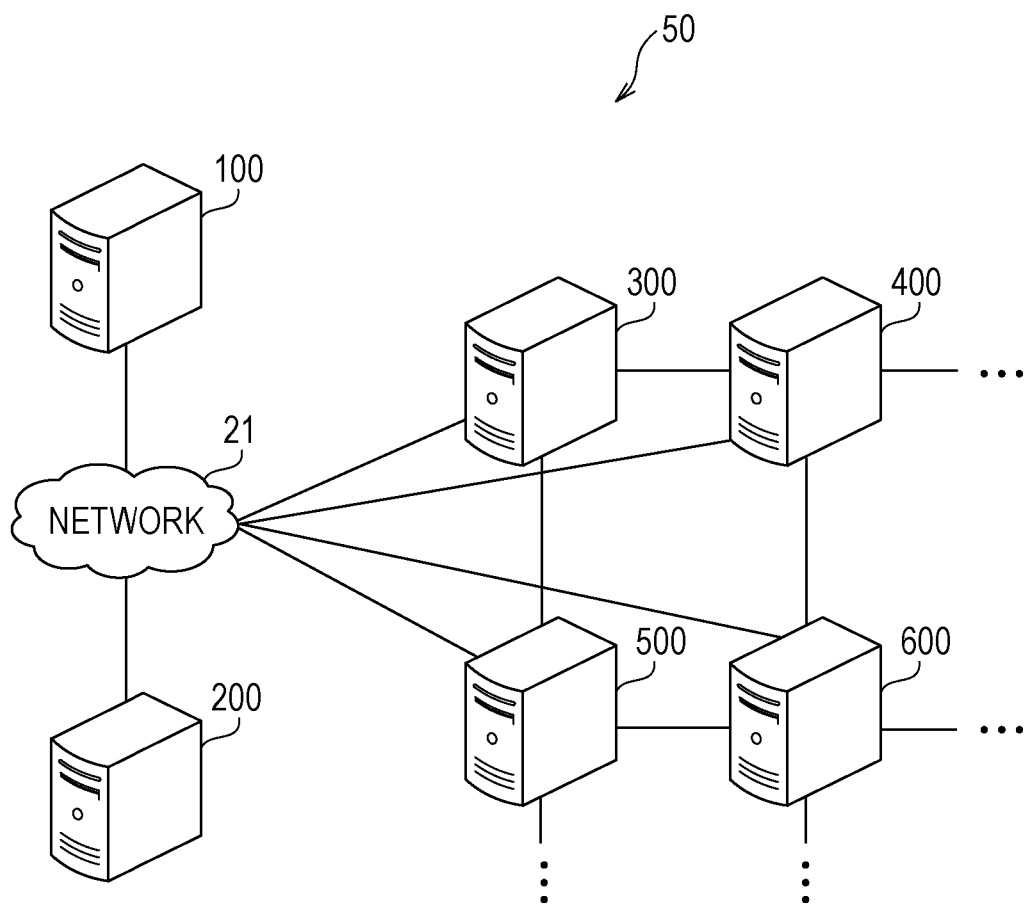
FIG. 2 is a diagram that depicts an example of a parallel processing system of a second embodiment.

FIG. 2 is a diagram that depicts an example of a parallel processing system of a second embodiment. The parallel processing system 50 includes a system management node 100, a job management node 200, and calculation nodes 300, 400, 500, 600, . . . . The system management node 100, the job management node 200, and the calculation nodes 300, 400, 500, 600, . . . are coupled to a management network in the parallel processing system 50. The calculation nodes 300, 400, 500, 600, . . . are coupled to one another by a grid network. For example, the network 21 may be a network in a connection topology called mesh interconnection or torus interconnection.

The system management node 100 monitors an electric power consumption of each of the calculation nodes 300, 400, 500, 600, . . . in the parallel processing system 50. The system management node 100 controls the operation mode of each of the calculation nodes 300, 400, 500, 600, . . . in response to a corresponding one of the monitored electric power consumptions.

The job management node 200 receives input of a job by a user, and allocates a job to the calculation nodes 300, 400, 500, 600, . . . . The job management node 200 instructs a calculation node to which a job is allocated to execute the job.

The job management node 200 may also collect information about an electric power consumption from the calculation nodes 300, 400, 500, 600, . . . in response to instructions from the system management node 100, and provide the information to the system management node 100. Furthermore, the job management node 200 may also instruct the calculation nodes 300, 400, 500, 600, . . . to change the operation mode in response to instructions from the system management node 100.

Each of the calculation nodes 300, 400, 500, 600, . . . includes a processor and a memory. The calculation nodes 300, 400, 500, 600, . . . execute in parallel a job allocated by the job management node 200. One job is allocated to one or more calculation nodes. One job occupies one or more calculation nodes to which the job is allocated.

Figure 3:
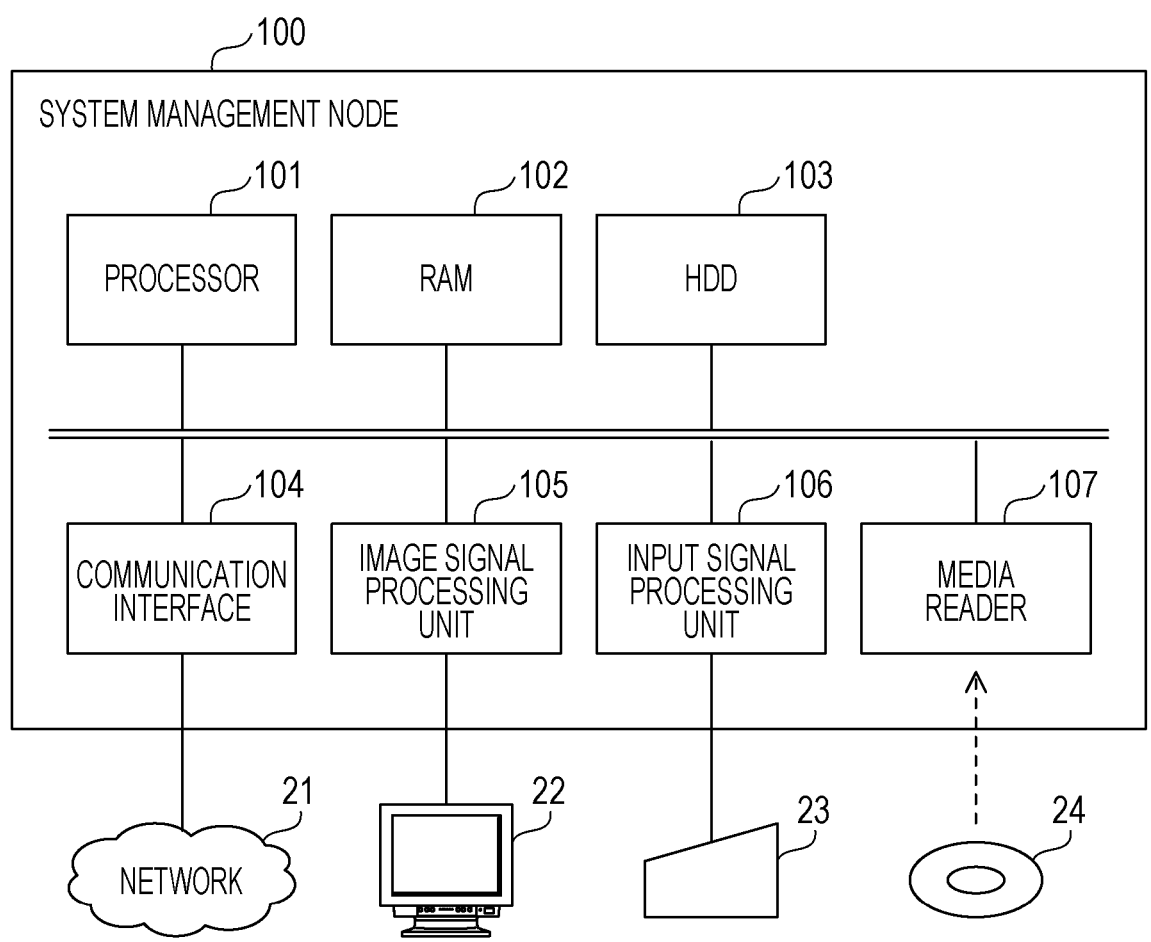
FIG. 3 is a diagram that depicts an example of hardware components of a system management node.

FIG. 3 is a diagram that depicts an example of hardware components of the system management node. The system management node 100 includes a processor 101, a RAM 102, an HDD 103, a communication interface 104, an image signal processing unit 105, an input signal processing unit 106, and a media reader 107. Each hardware component is coupled to a bus of the system management node 100. The job management node 200 is also realized by using similar hardware components to those of the system management node 100.

The processor 101 is a hardware component that controls information processing of the system management node 100. Alternatively, the processor 101 may be a multi-processor. The processor 101 is, for example, a CPU, a DSP, an ASIC, an FPGA, or the like. The processor 101 may be a combination of two or more elements out of a CPU, a DSP, an ASIC, an FPGA, and the like.

The RAM 102 is a main storage device of the system management node 100. The RAM 102 temporarily stores at least part of an operating system (OS) program and application programs to be executed by the processor 101. The RAM 102 stores various data that are used in processes that are executed by the processor 101.

The HDD 103 is an auxiliary storage device of the system management node 100. The HDD 103 magnetically writes or reads data to or from a built-in magnetic disk. The HDD 103 stores the OS program, the application programs, and various data. The system management node 100 may include an auxiliary storage device of another type, such as a flash memory and a solid state drive (SSD), and may include a plurality of auxiliary storage devices.

The communication interface 104 carries out communication with another device via the network 21. The communication interface 104 may be a wired communication interface or may be a wireless communication interface.

The image signal processing unit 105 outputs an image to a display 22 in accordance with instructions from the processor 101. The display 22 is coupled to the system management node 100. A cathode ray tube (CRT), a liquid crystal display, or the like, may be used as the display 22.

The input signal processing unit 106 acquires an input signal from an input device 23 coupled to the system management node 100, and outputs the input signal to the processor 101. For example, a pointing device, such as a mouse and a touch panel, a keyboard, or the like, may be used as the input device 23.

The media reader 107 is a device that reads programs and data recorded in a recording medium 24. For example, a magnetic disk, such as a flexible disk (FD) and an HDD, an optical disk, such as a compact disc (CD) and a digital versatile disk (DVD), a magneto-optical disk (MO), or the like, may be used as the recording medium 24. For example, a nonvolatile semiconductor memory, such as a flash memory card, may also be used as the recording medium 24. The media reader 107, for example, stores a program or data read from the recording medium 24 into the RAM 102 or the HDD 103 in accordance with instructions from the processor 101.

Figure 4:
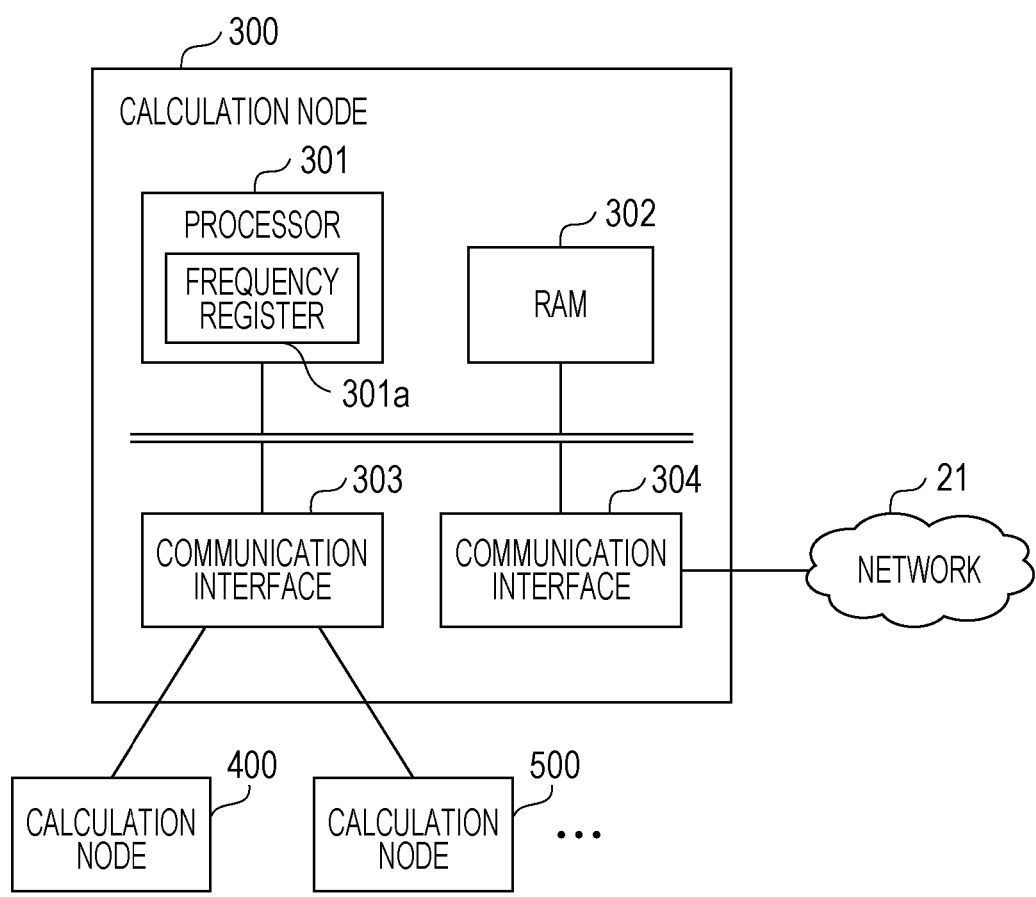
FIG. 4 is a diagram that depicts an example of hardware components of a calculation node.

FIG. 4 is a diagram that depicts an example of hardware components of each calculation node. The calculation node 300 includes a processor 301, a RAM 302, and communication interfaces 303, 304. Each hardware component is coupled to a bus of the calculation node 300. Each of the calculation nodes 400, 500, 600, . . . is also realized by using similar hardware components to those of the calculation node 300.

The processor 301 is a hardware component that controls information processing of the calculation node 300. The processor 301 may be a multi-processor. The processor 301 is, for example, a CPU, a DSP, an ASIC, an FPGA, or the like. The processor 301 may be a combination of two or more elements out of a CPU, a DSP, an ASIC, an FPGA, and the like. The processor 301 includes a frequency register 301a. The frequency register 301a is a register in which the operating frequency of the processor 301 is set.

The RAM 302 is a main storage device of the calculation node 300. The RAM 302 temporarily stores at least part of programs to be executed by the processor 301. The RAM 302 stores various data that are used in processes that are executed by the processor 301.

The communication interface 303 is an interface that is coupled to each of the calculation nodes 400, 500, . . . and that is used for communication with another calculation node. The communication interface 304 is an interface that is coupled to the network 21 and that is used for communication with another computer, such as the job management node 200.

Figure 5:
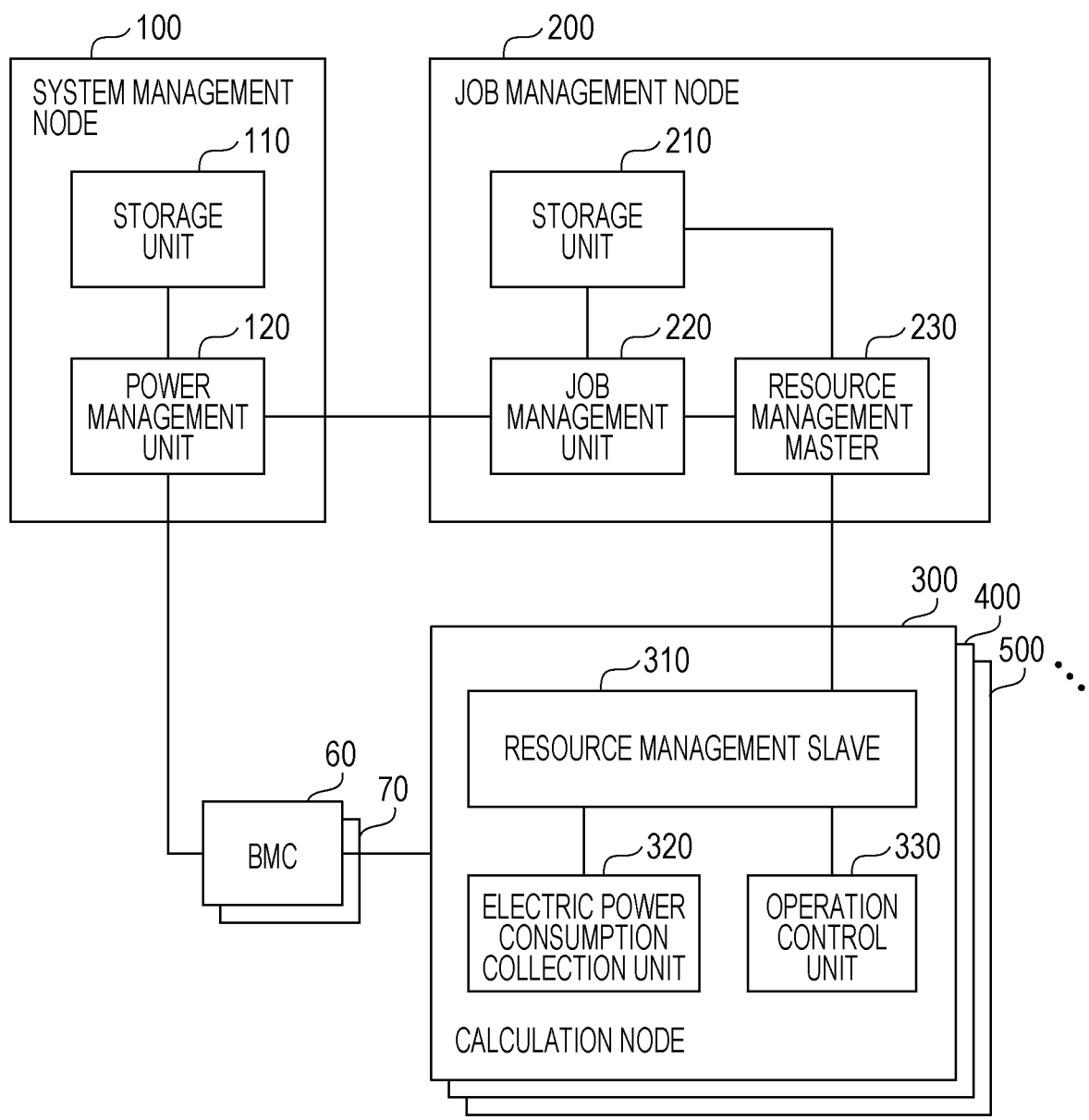
FIG. 5 is a diagram that depicts an example of functions of a parallel processing system.

FIG. 5 is a diagram that depicts an example of functions of the parallel processing system. The system management node 100 includes a storage unit 110 and a power management unit 120.

The storage unit 110 is implemented by using a storage area of the RAM 102 or HDD 103. The power management unit 120 is implemented by the processor 101. The processor 101 exercises the function of the power management unit 120 by executing a program stored in the RAM 102. Alternatively, the power management unit 120 may be implemented by a hard wired logic, such as an FPGA and an ASIC.

The storage unit 110 stores information regarding execution of a job (job information), acquired from the job management node 200 by the power management unit 120. The job information includes information about calculation nodes to which a job is allocated, the electric power consumption of the job, and a remaining execution time (remaining time) until the scheduled end time of the job. The electric power consumption of a job is the sum of the electric power consumptions of the calculation nodes to which the job is allocated.

The storage unit 110 stores an upper limit of a system electric power consumption that is permitted by the parallel processing system 50. The upper limit is, for example, a contract demand that is determined in accordance with a contract with a power company.

The power management unit 120 communicates with baseboard management controllers (BMCs) 60, 70 coupled to the calculation nodes 300, 400, 500, . . . , and acquires electric power consumptions measured by the BMCs 60, 70.

The BMCs 60, 70 measure electric power consumptions in a predetermined number of (for example, two, eight, sixteen, or the like) calculation nodes at predetermined intervals. The BMCs 60, 70 are coupled to the calculation nodes 300, 400, 500, . . . via a predetermined interface, and, for example, communicate with the system management node 100 via the network 21. Alternatively, the BMCs 60, 70 may be coupled to the system management node 100 via a predetermined interface, such as a serial interface, and communicate with the system management node 100.

The power management unit 120 calculates a system electric power consumption by adding up the electric power consumptions acquired from the BMCs 60, 70. The power management unit 120 monitors the system electric power consumption, and, when the system electric power consumption exceeds a threshold, controls the operation of part of the calculation nodes, thus achieving power savings. The threshold is determined in advance in accordance with an upper limit of the system electric power consumption. The threshold is, for example, a value smaller than the upper limit of the system electric power consumption.

Specifically, the power management unit 120 inquires of the job management node 200 about an electric power consumption and remaining execution time of each job. The power management unit 120 acquires the electric power consumption and remaining execution time of each job from the job management node 200, and selects a calculation node, to be subjected to reduction of the electric power consumption, based on the acquired information.

The power management unit 120 instructs the job management node 200 to reduce the electric power consumption of the selected calculation node.

The job management node 200 includes a storage unit 210, a job management unit 220, and a resource management master 230. The storage unit 210 is implemented by using a storage area of the RAM or HDD of the job management node 200. The job management unit 220 and the resource management master 230 are implemented by the processor of the job management node 200. The processor of the job management node 200 exercises the functions of the job management unit 220 and resource management master 230 by executing programs stored in the RAM of the job management node 200. Alternatively, the job management unit 220 and the resource management master 230 may be implemented by a hard wired logic, such as an FPGA and an ASIC.

The storage unit 210 stores information acquired by the resource management master 230 and information created by the job management unit 220. The job management unit 220 manages a job that is executed by each calculation node. The job management unit 220 provides an electric power consumption and remaining execution time of each job to the power management unit 120 in response to an inquiry from the power management unit 120 about the electric power consumption and remaining execution time of each job. Specifically, the job management unit 220 instructs the resource management master 230 to acquire the electric power consumption of each calculation node, and acquires the electric power consumption of each calculation node via the resource management master 230. The job management unit 220 calculates a calculation node to which each job is to be allocated, an electric power consumption, and a time from current time until scheduled end time (remaining execution time) for each job, and transmits the calculated results to the power management unit 120.

Upon receiving instructions to reduce an electric power consumption from the power management unit 120, the job management unit 220 instructs the resource management master 230 to submit a request to reduce the electric power consumption of the intended calculation node.

Upon receiving instructions to acquire the electric power consumption of each calculation node from the job management unit 220, the resource management master 230 acquires the electric power consumption of each calculation node, and provides the electric power consumption of each calculation node to the job management unit 220. Upon receiving instructions to submit a request to reduce the electric power consumption from the job management unit 220, the resource management master 230 submits the request to reduce the electric power consumption to the intended calculation node.

The calculation node 300 includes a resource management slave 310, an electric power consumption collection unit 320, and an operation control unit 330.

The resource management slave 310, the electric power consumption collection unit 320, and the operation control unit 330 are implemented by the processor 301. The processor 301 exercises the functions of the resource management slave 310, electric power consumption collection unit 320, and operation control unit 330 by executing programs stored in the RAM 302. Alternatively, the resource management slave 310, the electric power consumption collection unit 320, and the operation control unit 330 may be implemented by a hard wired logic, such as an FPGA and an ASIC.

Upon receiving instructions to acquire an electric power consumption from the resource management master 230, the resource management slave 310 acquires the electric power consumption of the calculation node 300 via the electric power consumption collection unit 320, and transmits the electric power consumption to the resource management master 230.

The electric power consumption collection unit 320 measures the electric power consumption of the calculation node 300, and provides the measured electric power consumption to the resource management slave 310.

The operation control unit 330 changes the operation mode of the calculation node 300 in response to instructions from the resource management slave 310. The operation control unit 330 reduces the electric power consumption of the calculation node 300 (power knob setting) by changing the operation mode of the calculation node 300. For example, the operation control unit 330 causes the calculation node 300 to operate in a power-saving mode in which the operating frequency of the processor 301 that is used to execute a job in the calculation node 300 is set at a value lower than usual. The operation control unit 330 is able to change, that is, for example, decrease or increase, the operating frequency of the processor 301 by changing a set value of the frequency register 301a. A processor that is used to execute a job may be provided in the calculation node 300 separately from the processor 301. As another example of the power-saving mode, when the calculation node 300 uses a plurality of processors to execute a job, it is conceivable that part of the processors is stopped. Furthermore, the operation control unit 330 may stop the calculation node 300 (for example, the operation control unit 330 may shut down the calculation node 300 or may shift the calculation node 300 into a standby state).

The functions of the electric power consumption collection unit 320 and operation control unit 330 are implemented by a predetermined power application programming interface (API). FIG. 6 is a table that illustrates an example of node electric power consumption information. The node electric power consumption information 211 is stored in the storage unit 210. The node electric power consumption information 211 includes items of node identifier and electric power consumption.

Identification information of a calculation node (node identifier) is entered in the item of node identifier. An electric power consumption of a calculation node indicated by the node identifier is entered in the item of electric power consumption. The unit of electric power consumption is watt (W).

For example, a record that the node identifier is "0xFF010004" and the electric power consumption is "120" is registered in the node electric power consumption information 211. This record indicates that the electric power consumption of the calculation node of the node identifier "0xFF010004" is 120 W.

FIG. 7 is a table that illustrates an example of job statistical information. The job statistical information 212 is stored in the storage unit 210. The job statistical information 212 includes items of job identifier, scheduled job end time, and node identifier.

Identification information of a job (job identifier) is entered in the item of job identifier. Scheduled time at which an intended job completes (scheduled end time) is entered in the item of scheduled job end time (scheduled end time). A node identifier is entered in the item of node identifier. For the node identifier of a calculation node to which no job is allocated, a job identifier and scheduled job end time are not set (which is indicated by hyphen "-").

For example, a record that the job identifier is "7101927", the scheduled job end time is "20:30", and the node identifiers are "0xFF010004", "0xFF010005", is registered in the job statistical information 212. This record indicates that the scheduled end time of the job of the job identifier "7101927" is 20:30 and the two calculation nodes of the node identifiers "0xFF010004" and "0xFF010005" are calculation nodes that execute the job.

A record that the job identifier is "7119895", the scheduled job end time is "20:00", and the node identifiers are "0xFF010006", "0xFF010007", is registered in the job statistical information 212. This record indicates that the scheduled end time of the job of the job identifier "7119895" is 20:00, and the two calculation nodes of the node identifiers "0xFF010006" and "0xFF010007" are calculation nodes that execute the job.

In the job statistical information 212, the job identifier and the scheduled job end time for the node identifier "0xFF010008" are not set ("-"). This indicates that no job is allocated to "0xFF010008".

FIG. 8 is a table that illustrates an example of job-based electric power consumption information. The job-based electric power consumption information 213 is stored in the storage unit 210. The job-based electric power consumption information 213 includes items of job identifier, node identifier, and total electric power consumption.

A job identifier is entered in the item of job identifier. A node identifier is entered in the item of node identifier. The total amount of electric power consumptions of calculation nodes that are indicated by node identifiers is entered in the item of total electric power consumption. For the node identifier of a calculation node to which no job is allocated, the job identifier is not set ("-").

For example, a record that the job identifier is "7101927", the node identifiers are "0xFF010004", "0xFF010005", and the total electric power consumption is "240", is registered in the job-based electric power consumption information 213. This record indicates that the calculation nodes that execute a job of the job identifier "7101927" are two calculation nodes of the node identifiers "0xFF010004", "0xFF010005" and the total amount of the electric power consumptions of these calculation nodes is 240 W.

A record that the job identifier is "7119895", the node identifiers are "0xFF010006", "0xFF010007", and the total electric power consumption is "350", is registered in the job-based electric power consumption information 213. This record indicates that the calculation nodes that execute a job of the job identifier "7119895" are two calculation nodes of the node identifiers "0xF010006", "0xFF010007" and the total amount of the electric power consumptions of these calculation nodes is 350 W.

In the job-based electric power consumption information 213, the job identifier for the node identifier "0xFF010008" is not set ("-"). This is because no job is allocated to "0xFF010008". The total electric power consumption "80" (W) for the node identifier "0xFF010008" is the electric power consumption of the single calculation node in a state where the calculation node is not executing a job.

FIG. 9 is a table that illustrates an example of job information. The job information 111 is stored in the storage unit 110. The job information 111 includes items of job identifier, node identifier, remaining job execution time and total electric power consumption.

A job identifier is entered in the item of job identifier. A node identifier is entered in the item of node identifier. A time from current time until scheduled end time of the job is entered in the item of remaining job execution time. The total amount of electric power consumptions of calculation nodes that execute the job is entered in the item of total electric power consumption. The job information 111 also includes information about a calculation node to which no job is allocated. For the node identifier of the calculation node to which no job is allocated, a job identifier and a remaining job execution time are not set ("-").

For example, a record that the job identifier is "7101927", the node identifiers are "0xFF010004", "0xFF010005", the remaining job execution time is "40 minutes", and the total electric power consumption is "240", is registered in the job information 111. This record indicates that the calculation nodes that execute the job of the job identifier "7101927" are the two calculation nodes of the node identifiers "0xFF010004", "0xFF010005". This record further indicates that the remaining job execution time of the job is 40 minutes and the total amount of the electric power consumptions of the calculation nodes that execute the job is 240 W.

A record that the job identifier is "7119895", the node identifiers are "0xFF010006", "0xFF010007", the remaining job execution time is "10 minutes", and the total electric power consumption is "350", is registered in the job information 111. This record indicates that the calculation nodes that execute the job of the job identifier "7119895" are two calculation nodes of the node identifiers "0xFF010006", "0xFF010007". This record also indicates that the remaining job execution time of the job is 10 minutes and the total amount of the electric power consumptions of the calculation nodes that execute the job is 350 W.

In the job information 111, the job identifier and the remaining job execution time for the node identifier "0xFF010008" are not set ("-"). This is because no job is allocated to "0xFF010008". The total electric power consumption "80" (W) for the node identifier "0xFF010008" is the electric power consumption of the single calculation node in a state where the calculation node is not executing a job.

Next, the procedure of each node in the parallel processing system 50 will be described. Initially, the procedure of the system management node 100 will be described.

Figure 10:
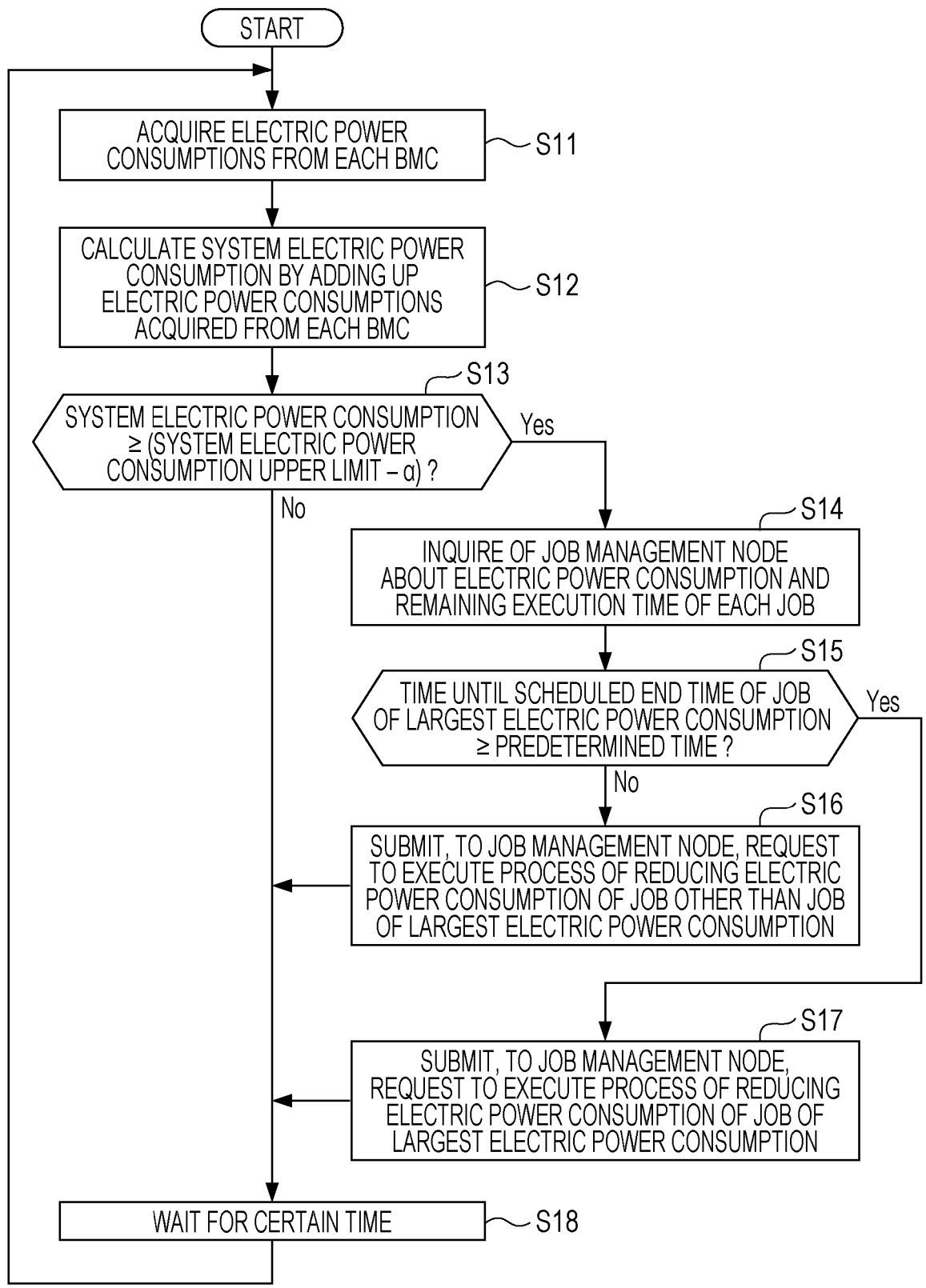
FIG. 10 is a flowchart that illustrates a process example of the system management node.

FIG. 10 is a flowchart that illustrates a process example of the system management node. Hereinafter, processes illustrated in FIG. 10 will be described in order of step numbers.

(S11) The power management unit 120 acquires electric power consumptions from each BMC (BMCs 50, 60).

(S12) The power management unit 120 adds up the electric power consumptions acquired from each BMC, and calculates a system electric power consumption. The system electric power consumption is the total amount of the electric power consumptions acquired from each BMC.

(S13) The power management unit 120 determines whether the system electric power consumption is larger than or equal to (system electric power consumption upper limit—α) where α is a positive real number. When the system electric power consumption is larger than or equal to (system electric power consumption upper limit—α), the power management unit 120 advances the process to step S14. When the system electric power consumption is smaller than (system electric power consumption upper limit—α), the power management unit 120 advances the process to step S18. The (system electric power consumption upper limit—α) is a threshold for the system electric power consumption. The system electric power consumption upper limit and the value of the parameter a are set in advance in the storage unit 110. By setting the threshold at a value smaller than the system electric power consumption upper limit that is permitted in the parallel processing system 50, the parallel processing system 50 is able to operate such that the system electric power consumption does not exceed the system electric power consumption upper limit. As described above, the system electric power consumption upper limit may be a contract demand that is determined in accordance with a contract with a power company.

(S14) The power management unit 120 inquires of the job management node 200 about an electric power consumption and remaining execution time of each job. The power management unit 120 acquires the job information 111, including the electric power consumption and remaining execution time of each job, from the job management node 200 in response to the inquiry, and stores the job information 111 in the storage unit 110.

(S15) The power management unit 120 determines whether a time until the scheduled end time of the job of the largest electric power consumption (a time difference from current time to the scheduled end time) is longer than or equal to a predetermined time, based on the job information 111. When the time until the scheduled end time of the job of the largest electric power consumption is longer than or equal to the predetermined time, the power management unit 120 advances the process to step S17. When the time until the scheduled end time of the job of the largest electric power consumption is shorter than the predetermined time, the power management unit 120 advances the process to step S16.

(S16) The power management unit 120 submits, to the job management node 200, a request to execute the process of reducing the electric power consumption of a job other than the job of the largest electric power consumption. For example, the power management unit 120 identifies a job other than the job of the largest electric power consumption from the job information 111, and transmits electric power reduction instructions on the identified job (that is, electric power reduction instructions on the calculation node that executes the identified job) to the job management node 200. The power management unit 120 advances the process to step S18.

(S17) The power management unit 120 submits, to the job management node 200, a request to execute the process of reducing the electric power consumption of the job of the largest electric power consumption. For example, the power management unit 120 identifies the job of the largest electric power consumption from the job information 111, and transmits electric power reduction instructions on the identified job (that is, electric power reduction instructions on the calculation node that executes the identified job) to the job management node 200. The power management unit 120 advances the process to step S18.

(S18) The power management unit 120 waits for a certain time. After that, the power management unit 120 advances the process to step S11.

As an example, the case where the predetermined time in the determination of step S15 is 20 minutes is assumed. According to the example of the job information 111 illustrated in FIG. 9, the job of the largest electric power consumption is the job of the job identifier "7119895". In this case, the remaining job execution time "10 minutes" of the job of the job identifier "7119895" is shorter than the predetermined time "20 minutes" (No in step S15). Therefore, the power management unit 120 transmits, to the job management node 200, electric power reduction instructions on the job of the job identifier "7101927" other than the job identifier "7119895". At this time, the power management unit 120 may transmit, to the job management node 200, electric power reduction instructions on the calculation node to which no job is allocated.

The predetermined time in the determination of step S15 may be determined for each job. For example, the power management unit 120 may determine a time of a predetermined percentage (for example, 30%, 20%, or the like) within a desired total execution time of a job as a predetermined time for the job.

Figure 11:
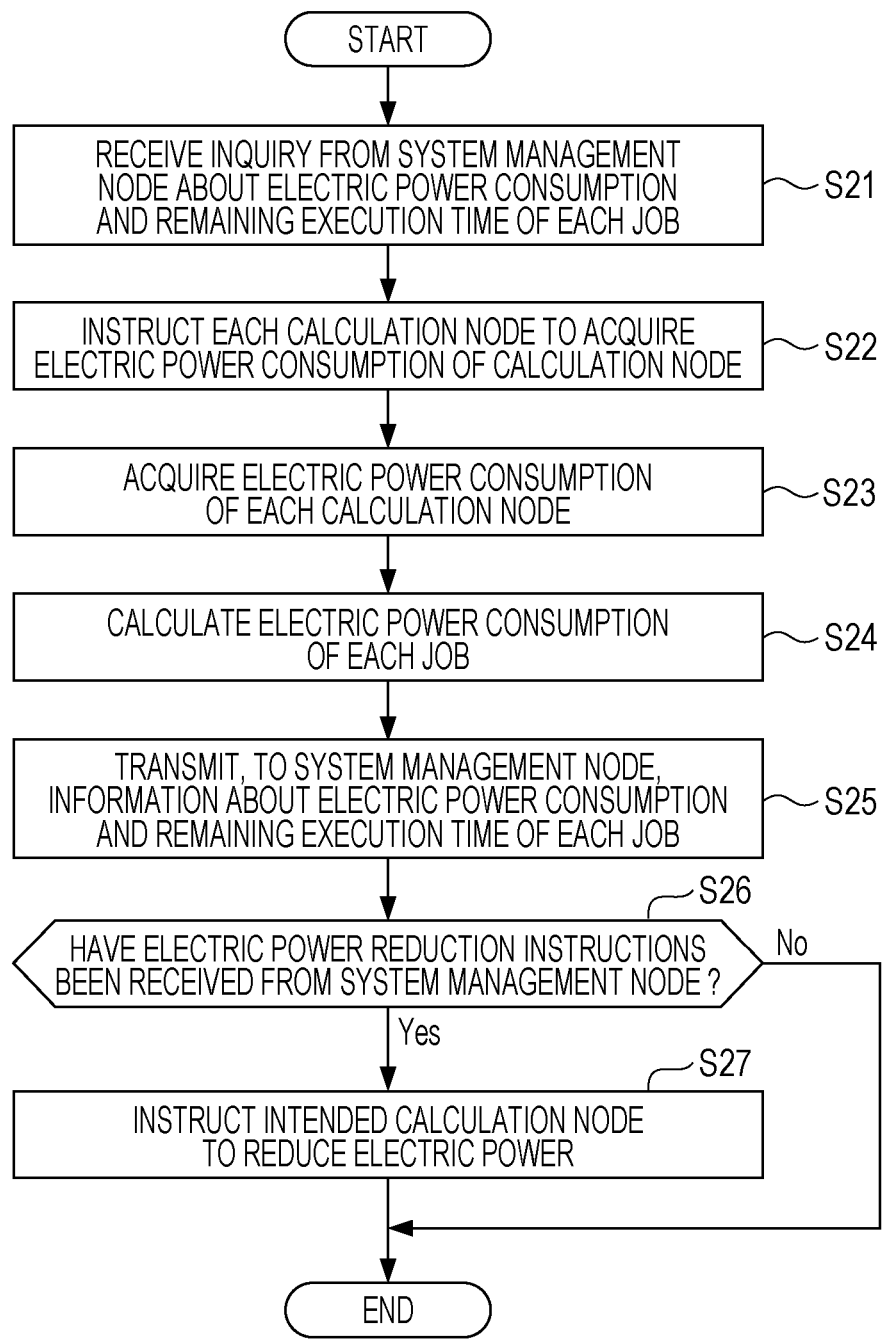
FIG. 11 is a flowchart that illustrates a process example of a job management node.

Next, the procedure of the job management node 200 will be described. FIG. 11 is a flowchart that illustrates a process example of the job management node. Hereinafter, processes illustrated in FIG. 11 will be described in order of step numbers.

(S21) The job management unit 220 receives an inquiry from the system management node 100 about the electric power consumption and remaining execution time of each job. The job management unit 220 instructs the resource management master 230 to acquire the electric power consumption of each calculation node.

(S22) The resource management master 230 instructs each calculation node to acquire the electric power consumption of the calculation node.

(S23) The resource management master 230 acquires the electric power consumption of the calculation node from each calculation node. The resource management master 230 generates the node electric power consumption information 211 based on information about the acquired electric power consumptions, and stores the node electric power consumption information 211 in the storage unit 210.

(S24) The job management unit 220 calculates the electric power consumption of each job, based on the node electric power consumption information 211. The job management unit 220 stores the job statistical information 212 in the storage unit 210 in advance. For this reason, the job management unit 220 couples the table of the node electric power consumption information 211 to the table of the job statistical information 212 by using the node identifiers as a key. Thus, the job management unit 220 generates the job-based electric power consumption information 213. At this time, by adding up the electric power consumptions of node identifiers corresponding to a common job identifier, a total electric power consumption in the job-based electric power consumption information 213 is obtained. The job management unit 220 also calculates a time from current time until scheduled end time (remaining execution time) for each job, based on the job statistical information 212.

(S25) The job management unit 220 transmits information about the electric power consumption and remaining execution time of each job to the system management node 100. Specifically, the job management unit 220 generates the job information 111 by adding the remaining execution time of each job to the job-based electric power consumption information 213, and transmits the job information 111 to the system management node 100.

(S26) The job management unit 220 determines whether electric power reduction instructions have been received from the system management node 100. When electric power reduction instructions have been received from the system management node 100, the job management unit 220 provides electric power reduction instructions to the resource management master 230, and advances the process to step S27. When electric power reduction instructions are not received from the system management node 100, the job management unit 220 ends the process.

(S27) The resource management master 230 instructs the intended calculation node to reduce electric power. For example, the resource management master 230 identifies the calculation node, to which the job specified by the electric power reduction instructions is allocated, based on the job statistical information 212. The resource management master 230 transmits electric power reduction instructions to the identified calculation node. The resource management master 230 ends the process.

In the above-described example, the job management unit 220 calculates the electric power consumption of each job by adding up the electric power consumptions of the calculation nodes. Instead, the power management unit 120 may execute the process of adding up the electric power consumptions of the calculation nodes for each job. In this case, the job management unit 220 provides the power management unit 120 with information about the electric power consumptions of the calculation nodes instead of the total electric power consumption in the job information 111. The resource management master 230 identifies an intended calculation node in response to electric power reduction instructions. Instead, the power management unit 120 or the job management unit 220 may select a calculation node intended for electric power reduction. For example, the power management unit 120 may select a calculation node intended for electric power reduction, corresponding to a job of the largest electric power consumption, based on the job information 111.

Figure 12:
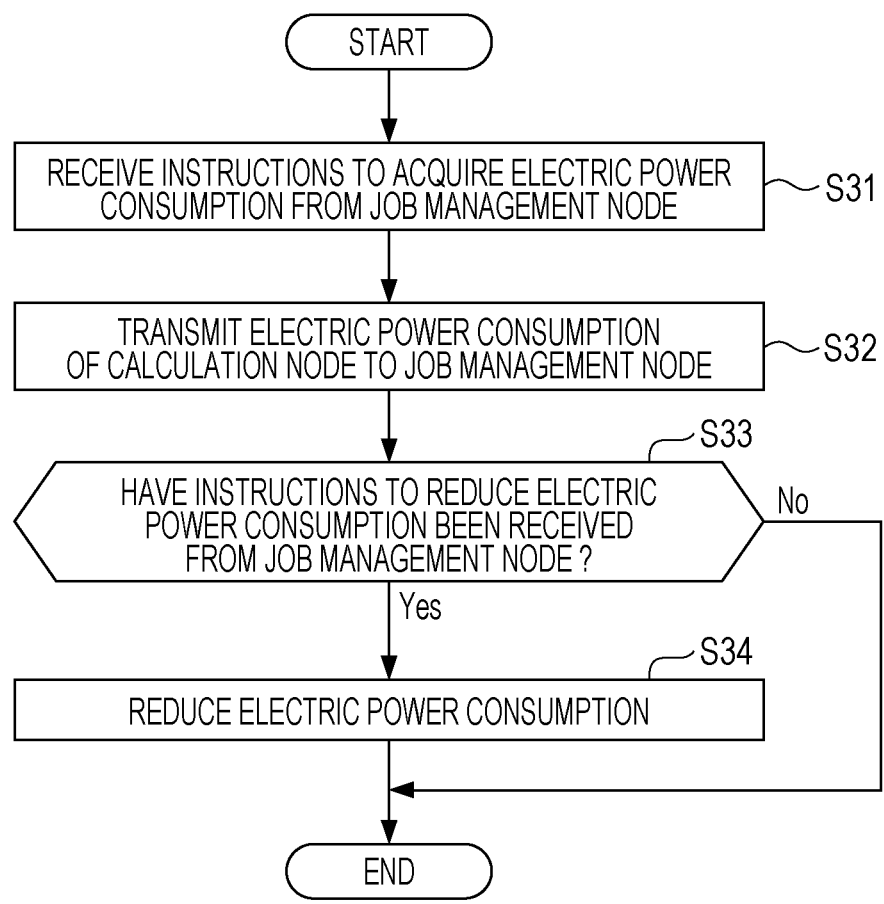
FIG. 12 is a flowchart that illustrates a process example of the calculation node.

Next, the procedure of the calculation node 300 will be described. The calculation nodes 400, 500, 600, . . . also execute a similar procedure to that of the calculation node 300. FIG. 12 is a flowchart that illustrates a process example of the calculation node. Hereinafter, processes illustrated in FIG. 12 will be described in order of step numbers.

(S31) The resource management slave 310 receives instructions to acquire an electric power consumption from the job management node 200.

(S32) The resource management slave 310 acquires the electric power consumption of the calculation node 300 via the electric power consumption collection unit 320, and transmits the electric power consumption of the calculation node 300 to the job management node 200.

(S33) The resource management slave 310 determines whether instructions to reduce the electric power consumption have been received from the job management node 200. When the instructions to reduce the electric power consumption have been received, the resource management slave 310 instructs the operation control unit 330 to reduce the electric power consumption, and advances the process to step S34. When the instructions to reduce the electric power consumption are not received, the resource management slave 310 ends the process.

(S34) The operation control unit 330 reduces the electric power consumption of the calculation node 300. For example, the operation control unit 330 shifts the calculation node 300 into the power-saving mode. In one example, the operation control unit 330 reduces the electric power consumption of the processor 301 by setting a frequency lower than usual in the frequency register 301*a* of the processor 301 that is used to execute a job. Alternatively, when a plurality of processors are used to execute a job, the operation control unit 330 may reduce the electric power consumption by stopping part of the processors. Alternatively, the operation control unit 330 may stop the calculation node 300 (for example, shut down the calculation node 300 or shift the calculation node 300 into a standby state). The operation control unit 330 ends the process.

After the power management unit 120 submits a request to reduce the electric power consumption, as execution of any one of the jobs ends, the power management unit 120 may receive a notice of the end of the job from the job management node 200. In response to the notice, the power management unit 120 may instruct the job management node 200 to cause the calculation node of which the electric power consumption is reduced (in the power-saving mode) into a normal mode. The job management node 200 instructs the intended calculation node to shift into the normal mode in response to instructions from the power management unit 120. The calculation node that has received the instructions shifts from the power-saving mode to the normal mode (for example, a set processor frequency is returned to a frequency before underclocking or, when the calculation node is stopped, the calculation node is started up).

As illustrated above, as the system electric power consumption reaches the threshold, the system management node 100 selects a calculation node of which the electric power consumption is to be reduced, based on a comparison between a predetermined time and a time until scheduled end time of a first job of the largest electric power consumption.

When the time until the scheduled end time of the first job is longer than or equal to the predetermined time T0, the system management node 100 executes the process of reducing the electric power consumption of the calculation node that executes the first job. In this case, when the time until the scheduled end time of the first job is longer than or equal to the predetermined time, the degree of progress of the first job is also presumably low. Therefore, even if the first job does not complete, a loss of the amount of electric power for executing the first job is reduced. By reducing the electric power consumption of the first node of the largest electric power consumption, the electric power consumption of the overall system is efficiently reduced, so that it is possible to continue execution of the second job by the second node other than the first node.

On the other hand, when the time until the scheduled end time of the first job is shorter than the predetermined time, the system management node 100 executes the process of reducing the electric power consumption of the second node other than the first node that executes the first job. In this case, when the time until the scheduled end time of the first job is shorter than the predetermined time, the degree of progress of the first job is also presumably high. Therefore, if the first job does not complete, a loss of the amount of electric power for executing the first job till then is large. If the completion rate of the first job is decreased by reducing the electric power consumption of the first node although the first job ends soon, there is a high risk that the amount of electric power to be consumed by the process of the first job till then and re-execution of the first job becomes large. For this reason, the system management node 100 reduces the electric power consumption of the second node, and gives a higher priority to execution of the first job. Thus, the system management node 100 executes control such that the first job appropriately completes.

By improving the completion rate of the first job, it is possible to reduce re-execution of the first job and reduce the amount of electric power to be consumed in the parallel processing system 10. Furthermore, as described above, various methods (reducing a processor frequency, stopping the calculation node 300, and the like) are conceivable as a method of reducing the electric power consumption of the calculation node 300. The power management unit 120 may select any method based on a situation in order to reduce the electric power consumption. For example, the power management unit 120 may initially decrease the operating frequency of the processor of the calculation node intended for electric power reduction, and, when the system electric power consumption is still not smaller than (system electric power consumption upper limit—α), may instruct the job management node 200 to stop the intended calculation node. At this time, the power management unit 120 may reduce the operating frequency of a processor in one calculation node such that the system electric power consumption becomes smaller than (system electric power consumption upper limit—α), and may instruct the job management node 200 to stop another calculation node. By flexibly selecting a method of reducing the electric power consumption in this way, it is possible to reduce the electric power consumption and improve the usage efficiency of the calculation nodes 300, 400, 500, 600, . . . .

In the second embodiment, the example in which the system management node 100 and the job management node 200 are implemented as separate nodes is described. Instead, the functions of both nodes may be implemented by one node. For example, part or all of the functions of the job management node 200 may be incorporated in the system management node 100.

The information processing of the first embodiment is realized by causing the processing unit 11b to execute a program. The information processing of the second embodiment is realized by causing the processor 101 to execute a program. The program is recordable in the computer-readable recording medium 24.

For example, the program is distributable by distributing the recording medium 24 in which the program is recorded. The program may be stored in another computer, and then the program may be distributed via a network. A computer, for example, may store (install) a program recorded in the recording medium 24 or a program received from another computer in a storage device, such as the RAM 102 and the HDD 103, and may execute the program by reading the program from the storage device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system management device for a parallel processing system, the system management device comprising:
  a memory configured to store first information about an electric power consumption of each of a plurality of nodes and second information about a plurality of jobs that are executed in parallel by the plurality of nodes; and
  a processor coupled to the memory and configured to:
    when a total electric power consumption of the plurality of nodes reaches a threshold, extract a first job of the largest electric power consumption from among the plurality of jobs, based on the first and second information stored in the memory,
    when a remaining execution time of the first job, which indicates a period of time from a current time until a scheduled end time of the first job, is longer than or equal to a predetermined time, execute a first process of reducing the electric power consumption of a first node that executes the first job, and
    when the remaining execution time of the first job is shorter than the predetermined time, execute a second process of reducing the electric power consumption of a second node that does not execute the first job;
  wherein the processor is configured to:
    reduce the electric power consumption of the first node by issuing an instruction to stop the first node or by issuing an instruction to decrease an operating frequency of a processor of the first node; and
    reduce the electric power consumption of the second node by issuing an instruction to stop the second node or by issuing an instruction to decrease an operating frequency of a processor of the second node.

2. The system management device of claim 1, wherein the processor is configured to use a total amount of electric power consumptions of nodes to which each job is allocated, as an electric power consumption of the each job.

3. The system management device of claim 1, wherein the threshold is a value smaller than an upper limit of an electric power consumption that is permitted in the parallel processing system.

4. The system management device of claim 1, wherein the processor is configured to, when the total electric power consumption reaches the threshold, acquire third information about the plurality of jobs from a job management node that manages the plurality of jobs that are executed by the plurality of nodes, the third information including information on nodes to which each job is allocated and the remaining execution time of the each job.

5. A system comprising:
  a plurality of nodes that execute a plurality of jobs in parallel, the plurality of nodes each including a first processor; and
  a system management device including a second processor configured to:
    when a total electric power consumption of the plurality of nodes reaches a threshold, extract a first job of the largest electric power consumption from among the plurality of jobs, based on first information about an electric power consumption of each of the plurality of nodes and second information about the plurality of jobs that are executed in parallel by the plurality of nodes,
    when a remaining execution time of the first job, which indicates a period of time from a current time until a scheduled end time of the first job, is longer than or equal to a predetermined time, execute a first process of reducing the electric power consumption of a first node that executes the first job, and
    when the remaining execution time of the first job is shorter than the predetermined time, execute a second process of reducing the electric power consumption of a second node that does not execute the first job;
  wherein the second processor is configured to:
    reduce the electric power consumption of the first node by issuing an instruction to stop the first node or by issuing an instruction to decrease an operating frequency of the first processor of the first node; and reduce the electric power consumption of the second node by issuing an instruction to stop the second node or by issuing an instruction to decrease an operating frequency of the first processor of the second node.

6. A method performed by a system management device for a parallel processing system including a plurality of nodes that execute a plurality of jobs in parallel, the method comprising:

when a total electric power consumption of the plurality of nodes reaches a threshold, extract a first job of the largest electric power consumption from among the plurality of jobs, based on first information about an electric power consumption of each of the plurality of nodes and second information about the plurality of jobs that are executed in parallel by the plurality of nodes;

when a remaining execution time of the first job, which indicates a period of time from a current time until a scheduled end time of the first job, is longer than or equal to a predetermined time, execute a first process of reducing the electric power consumption of a first node that executes the first job; and when the remaining execution time of the first job is shorter than the predetermined time, execute a second process of reducing the electric power consumption of a second node that does not execute the first job;

wherein reducing the electric power consumption of the first node comprises issuing an instruction to stop the first node or issuing an instruction to decrease an operating frequency of a processor of the first node; and wherein reducing the electric power consumption of the second node comprises issuing an instruction to stop the second node or issuing an instruction to decrease an operating frequency of a processor of the second node.

* * * * *